US010871551B2

(12) United States Patent
Fluhler

(10) Patent No.: US 10,871,551 B2
(45) Date of Patent: Dec. 22, 2020

(54) LEAST SQUARES FIT CLASSIFIER FOR IMPROVED SENSOR PERFORMANCE

(71) Applicant: Herbert U Fluhler, Huntsville, AL (US)

(72) Inventor: Herbert U Fluhler, Huntsville, AL (US)

(*) Notice: Subject to any disclaimer, the term of this patent is extended or adjusted under 35 U.S.C. 154(b) by 714 days.

(21) Appl. No.: 15/396,678

(22) Filed: Jan. 1, 2017

(65) Prior Publication Data

US 2017/0192088 A1    Jul. 6, 2017

Related U.S. Application Data

(60) Provisional application No. 62/387,671, filed on Dec. 31, 2015.

(51) Int. Cl.
*G01S 7/292* (2006.01)
*G01S 7/288* (2006.01)

(52) U.S. Cl.
CPC ..... *G01S 7/2922* (2013.01); *G01S 2007/2886* (2013.01)

(58) Field of Classification Search
CPC ..................................................... G01S 7/2922
USPC .............................................................. 342/93
See application file for complete search history.

(56) References Cited

U.S. PATENT DOCUMENTS

| 4,800,891 | A | * | 1/1989 | Kim | .......................... | A61B 8/06 |
| | | | | | | 600/455 |
| 5,170,359 | A | * | 12/1992 | Sax | .......................... | G10L 25/48 |
| | | | | | | 324/102 |
| 5,483,963 | A | * | 1/1996 | Butler | .................. | G01S 7/52034 |
| | | | | | | 600/437 |
| 5,485,157 | A | * | 1/1996 | Long | ...................... | G01S 7/2927 |
| | | | | | | 342/159 |
| 6,078,281 | A | * | 6/2000 | Milkovich | ............ | G01S 7/2926 |
| | | | | | | 342/162 |
| 6,278,961 | B1 | * | 8/2001 | Kadtke | ................ | G06K 9/6217 |
| | | | | | | 702/189 |
| 6,564,176 | B2 | * | 5/2003 | Kadtke | ................ | G06K 9/6217 |
| | | | | | | 702/189 |
| 6,625,569 | B2 | * | 9/2003 | James | .................... | G05B 17/02 |
| | | | | | | 702/104 |

(Continued)

*Primary Examiner* — Vladimir Magloire
*Assistant Examiner* — Nuzhat Pervin
(74) *Attorney, Agent, or Firm* — Patent Grove LLC; Tomas Friend

(57) ABSTRACT

An improvement to sensor detection performance is described through use of novel least squares based (or other) sensor measurements fitting, which can significantly improve or increase the sensor Probability of Detection (Pd) while simultaneously improving or decreasing the sensor Probability of False Alarm (Pfa). Instead of just thresholding a scalar magnitude as is done in prior art signal detection methods, the new method seeks to classify time (or space, or spatio-temporal) sequenced Signal measurements from time (or space, or spatio-temporal) sequenced Noise measurements through unique features characteristic of each. The proposed method ma be implemented on most modern Radar Signal Data Processors (SDP) and therefore affords a near term, low cost opportunity to both significantly increase detection and tracking performance and/or enable ready adoption of new additional auxiliary missions currently not possible with resource constrained sensors.

5 Claims, 6 Drawing Sheets

(56) References Cited

U.S. PATENT DOCUMENTS

| | | | | |
|---|---|---|---|---|
| 6,987,707 B2* | 1/2006 | Feintuch | G01S 15/04 | 367/87 |
| 7,499,515 B1* | 3/2009 | Beadle | H04L 1/0026 | 375/358 |
| 7,555,064 B2* | 6/2009 | Beadle | H04L 1/0003 | 375/316 |
| 8,026,842 B2* | 9/2011 | Fox | G01S 7/2922 | 342/52 |
| 8,026,844 B2* | 9/2011 | Fox | G01S 13/867 | 342/173 |
| 8,330,647 B2* | 12/2012 | Fox | G01S 13/867 | 342/91 |
| 8,784,318 B1* | 7/2014 | Napolitano | A61B 8/145 | 600/443 |
| 8,860,602 B2* | 10/2014 | Nohara | G01S 7/003 | 342/26 R |
| 9,030,351 B2* | 5/2015 | Fox | G01S 13/867 | 342/91 |
| 9,696,409 B2* | 7/2017 | Fox | G01S 13/867 | |
| 2002/0133317 A1* | 9/2002 | Kadtke | G06K 9/6217 | 702/189 |
| 2003/0018928 A1* | 1/2003 | James | G06K 9/00536 | 714/25 |
| 2003/0061015 A1* | 3/2003 | Ben-Gal | G06K 9/6282 | 703/2 |
| 2005/0058021 A1* | 3/2005 | Feintuch | G01S 15/04 | 367/99 |
| 2009/0015460 A1* | 1/2009 | Fox | G01S 13/886 | 342/53 |
| 2009/0060014 A1* | 3/2009 | Beadle | H04L 1/0036 | 375/227 |
| 2009/0060015 A1* | 3/2009 | Beadle | H04L 1/206 | 375/227 |
| 2010/0283662 A1* | 11/2010 | Fox | G01S 7/2922 | 342/53 |
| 2010/0283848 A1* | 11/2010 | Adler | F41H 13/0056 | 348/143 |
| 2011/0001657 A1* | 1/2011 | Fox | G01S 13/723 | 342/107 |
| 2011/0257911 A1* | 10/2011 | Drees | G06Q 50/06 | 702/61 |
| 2012/0084063 A1* | 4/2012 | Drees | G05F 1/66 | 703/6 |
| 2013/0325377 A1* | 12/2013 | Drees | G06Q 10/06 | 702/61 |
| 2014/0062757 A1* | 3/2014 | Fox | G01S 13/723 | 342/52 |
| 2014/0097979 A1* | 4/2014 | Nohara | G01S 13/538 | 342/90 |
| 2015/0080725 A1* | 3/2015 | Wegner | G01S 15/8915 | 600/440 |
| 2016/0033623 A1* | 2/2016 | Holder | G01S 13/06 | 342/93 |

\* cited by examiner

LEAST SQUARES FIT CLASSIFIER FOR IMPROVED SENSOR PERFORMANCE

CROSS REFERENCE TO RELATED APPLICATION

This application claims the benefit of provisional application No. 62/387,671 filed Dec. 31, 2015, which is incorporated by reference herein in its entirety.

STATEMENT REGARDING FEDERALLY FUNDED DEVELOPMENT

No U.S. or Foreign Government funding was employed in the development of this invention.

FIELD OF THE INVENTION

The present invention relates generally to Doppler, radar, sonar or other systems that emit signals in the presence of noise or clutter, and particularly to a sensor system that discriminates moving targets from such noise or clutter by magnitude thresholding the Pulse Doppler Filter output signals to create detections that indicate the presence or non-presence of the desired target or phenomenon, to the exclusion of non-target or non-phenomenon induced detections (a.k.a, False Detections or False Alarms).

BACKGROUND OF THE INVENTION

Historically, radars have been highly integrated and finely tuned instruments that are often incredibly difficult to upgrade or change. Modern radars are now a bit more malleably since they often employ modern Commercial Off The Shelf (COTS) processors and cards that offer significantly modularized subsystems and make them more software based. For the first time, many are speaking of "Software Defined Radars". Also, the industry is now pursuing an all-digital design called the "All Digital Radar" which converts digital signals to Radio Frequencies (RF), and back again, at the element level in the antenna array. The hope is that such new architectures will be able to exploit Moore's Law of computer pricing to make radars less expensive, while at the same time offering unparalleled potential array and beam forming flexibility to enable all manner of previously unrealizable theoretical radar capabilities.

A key attribute of these developments is that radars (and most other sensors as well) are becoming more defined by their software than by their hardware. Additionally, being more software defined, they are potentially more amenable to changes and improvements via software enhancements. This places a priority on means that can improve these sensors through changes in software, such as with enhanced algorithms.

At the same time, almost all new as well as existing radars are being required to increase their performance to meet new more challenging missions and requirements. Additionally, many radars are being tasked to perform additional missions and functions beyond their legacy roles. One example of this might be for a radar to also provide communications of data to other neighbor radars or a compatible remote communications node. Another example might be to perform air traffic control surveillance while also performing weather radar measurement functions.

The problem with new and evolving radar needs is that very few radars have an excess of radar resources (i.e., the timeline and the RF energy/power needed to perform the assigned sensing mission) to accommodate more stressing requirements, let alone add new missions or new functions beyond their established design. Even new designs for radars find hard physics based limits preventing achievement of their sponsor's desired performance levels. The reality of all radars is that no radar has a surplus of radar Power Aperture (PA) product (the multiplication of the radar's RF power output and the area of its main antenna) to do anything more than it does today, and achieving adequate power PA for new radars is proving very challenging for numerous reasons. Stated another way, every radar in existence is being used at near maximum Occupancy (the percentage of time the radar is actually transceiving within the assigned search sector), typically near 100%, meaning it is maximally busy doing its core mission, and even then too often not doing it as well as their designers might like.

This fact is a direct by-product of the well-known Radar Range Equation that states that the detection range of a radar is proportional to the 4th root of the Signal to Noise Ration (SNR), or equivalently to the 4th root of the radar's power. This is an incredibly hobbling physics-based dependency that demands 16 times (12 dB) more radar power in order to be able to detect the same target at only twice the distance.

In addition to ever increasing demands for seeing smaller targets further out, modern radars are being asked to survey more volume (larger elevations and larger solid angles), and often in less time, which seriously stresses the Power-Aperture product budget of a radar. At the same time, radars are also being required to increase their update rates on more challenging targets, further stressing the Power Aperture Product budget.

The bottom line is that radars are already at their breaking point (or already broken and sponsors sometimes not admitting it), and there simply are NO extra radar resources available to do any range or sensitivity improvements without some new breakthrough technology. Needless to say, the assignment of additional other missions to the radar (such as the communications and weather examples given above) is untenable under the stress of needing to achieve the core mission performance unless the radar's proponents are willing to accept a degradation in already marginal core capability performance (which few will accept).

As seen above, there is great motivation to improve radar (and for that matter many other sensors') detection range performance and also to provide more surveillance coverage and to be able to scan it in less time. As is well known to one skilled in the art of radar, the range, coverage and update rate for surveillance is dependent on the radar's radiated RF PA product. Hidden within the PA parameter is an assumed level of Signal to Noise Ratio (SNR) from the target return, above which a target is declared to be detected, and below which it is declared to be noise or interference. However, even the modern detection algorithms used to detect targets from noise today mask a known but little appreciated fact.

Specifically, the threshold used for detecting the presence or absence of a target is often set high, sometimes even quite high, in order to minimize false detections from noise or interference. One could easily decrease this threshold to detect weaker targets or targets at longer ranges, but this would be at the expense of admitting more false detections from noise and/or interference. Were it just a numbers game (that is, numerically how many true detections vs false alarms were needing to be processed in the Signal Processor) this would not be much of a problem with modern processors. However, the false detection of noise and/or interference can end up having serious ramifications and impose a deleterious degradation to net radar performance.

For example, a false detection often needs to be followed up on with a further interrogation (further expenditure of radar resources) to verify the truth of its existence, even if the first detection came from noise. Sometimes, particularly if the radar detection threshold has been set lower to be more sensitive, that second verification interrogation could also produce a second false detection. That in turn now prompts the radar to expend even more radar resources in the form of tracking and classification interrogations that are often even more expensive in terms of radar resources. If this is just an occasional occurrence, then it is of little concern. But if this happens frequently over the surveillance volume of the radar, then it can bring the radar to its knees, servicing all the follow-up interrogations for false detections instead of doing the core mission surveillance intended. Recall that since almost all radars are operating at near 100% Occupancy (and should be in order to make maximum use of the radar) it does not require too many false detections to significantly disrupt the radars intended functionality and performance.

Note that although the discussion above and for the majority of this disclosure is radar centric, almost all sensors of most any kind can suffer from similar issues and constraints as those described above. Therefore as will be appreciated by one skilled in the art of sensors, the principles taught by this invention are equally applicable to a wide variety of sensors, and the invention should not be construed to apply only to radar sensors. As will be shown, the key requirement for applicability of the invention to a sensor is simply that the sensor provides a sequence of multiple measurements to use in the algorithm to be described subsequently.

SUMMARY OF THE INVENTION

The current invention is aimed at mitigating the above-described situation by providing a way to discriminate a true target-induced detector threshold crossing (i.e. a true detection) from a false noise or interference-induced detector threshold crossing (i.e. a false detection, a.k.a. a False Alarm) in the sensor. With such discernment, one can reject the false detections from noise and interference, which are heretofore indiscernible from true detections, and only apply follow-on processing to the known true detections created from true targets. Therefore, it is a first objective of the current invention to classify a true target or phenomenology signal detection as such, and a true noise or interference signal detection as such, and to minimize misclassification of a true target or phenomenology signal noise as a false noise or interference signal detection and visa versa.

Furthermore, with such discernment, one can then lower the detector threshold to detect weaker or farther out targets, while not incurring a significant false alarm since with the aid of the invention, the false detections can be largely discriminated as such and summarily rejected. It is therefore a second objective of the current invention to provide a way for reducing the detection threshold in order to enjoy improved sensor sensitivity, while simultaneously mitigating the otherwise normal associated increase in False Alarm detections.

It is a third objective of the present invention to permit enhanced detection range and target sensitivity without the increase in (expensive) PA product.

Furthermore, it is a fourth objective of the current invention to permit use of less resource intensive waveforms or interrogations while still retaining the same or similar sensor performance, and using the thusly freed up and recovered sensor resources to permit the sensor to perform other missions and other functions without degrading the core capabilities from that realized before invocation of the invention.

Because the invention is a method instantiated in an algorithm that can be embedded in a modern Signal Data Process (SDP) and improve functioning of the Signal Data Processor, it is a fifth objective of the current invention to be easily, quickly and economically implemented in new radars or retrofitted to old radars, thereby exploiting the industry move to high performance COTS hardware and the new Software Defined Radar paradigm.

Although the above (and subsequent) description of the invention centers on radar, it should be recognized that application of the invention to Pulsed Doppler Radar is only one embodiment of the invention. Indeed the invention can be recast and applied to other types of radar (for example, Continuous Wave (CW), Frequency Modulated CW (FMCW), Pseudo-Random and Random (Noise) Radar, etc.) by one skilled in the art of radar and radar signal processing. Additionally, the invention may likewise be applied to many other sensors as described previously. The key requirement is that the sensor employ a sequence of measurements in its detection process, be those sequenced either in time, space, space and time, or any other sequence of parameter measurements relevant to the sensor detection process (for example a sequence of polarization measurements might be used). As long as a sequence of multiple measurements is available, the shortly to be described least squares fits and statistical tests can be computed and used to generate features which can then be fed to a classifier to discern true target derived detections from noise or interference derived False Alarm detections. With this new capability to discern true from false detections, the sensor detection threshold can be lowered to enjoy improved performance without adverse effects from degraded false alarm performance.

DETAILED DESCRIPTION OF THE DRAWINGS

Figure 1:
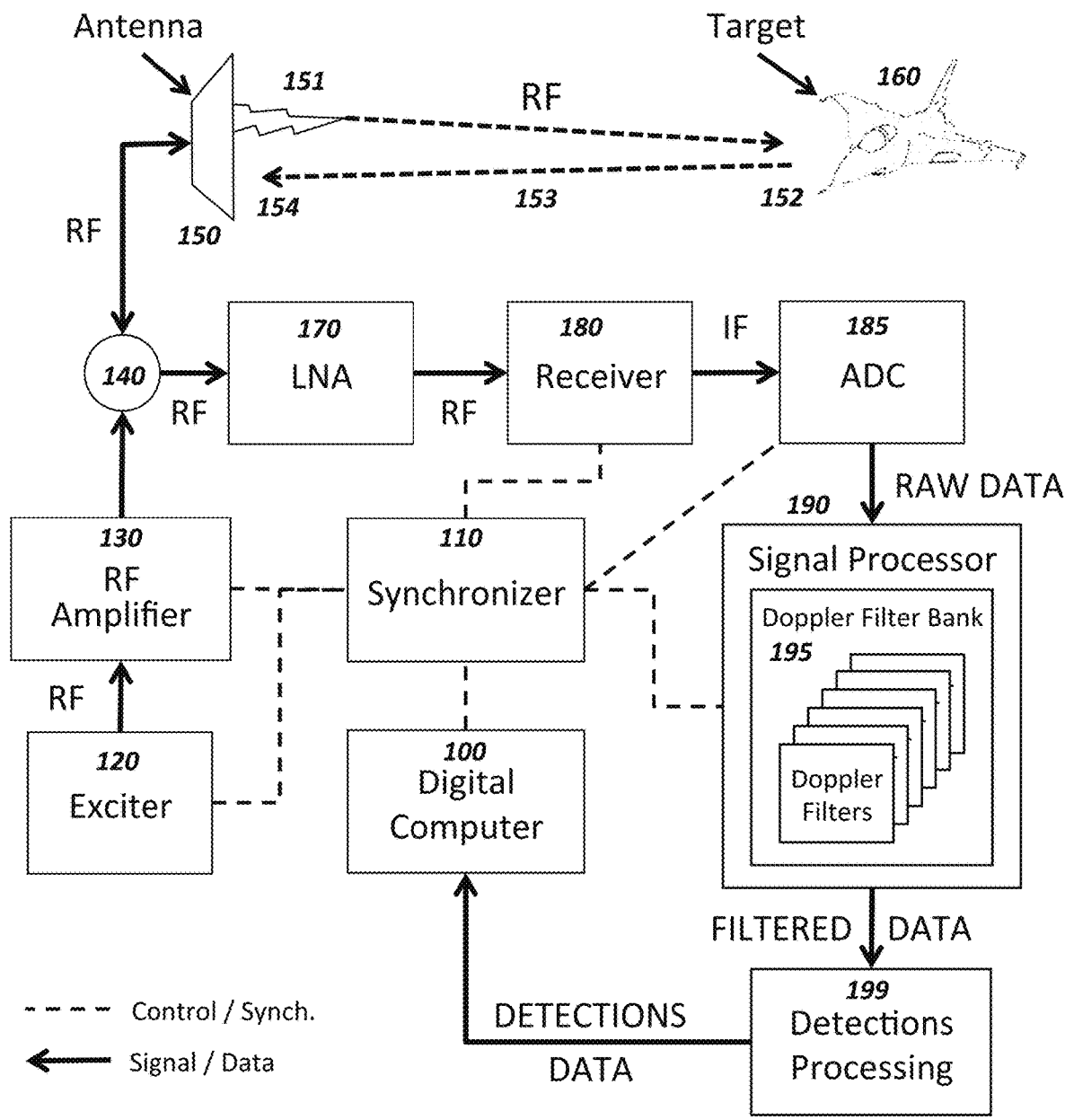
FIG. 1 shows a generic radar block diagram of the Prior Art for a Pulse Doppler Radar embodiment with its key subsystems and components and the general flow of RF, Intermediate Frequency (IF) and interface/control/synchronization (digital) signals. Also shown is the Signal Data Processor with its embedding Doppler Filter Bank algorithms which compute the signal to be thresholded for detections and are the key element improved upon by the current invention.

FIG. 1 shows a Prior Art block diagram of a Pulse Doppler Radar. Many other sensors will exhibit similar sensor block diagrams aiding in the viability of applying the invention to those sensors as well. A Digital Computer 100 or alternative logic circuits runs the radar by commanding and controlling the circuits and subsystems of the radar (110, 120, 130, 150, 160, 170, 180, 185, 190) and employing a scheduling program to scan radar beams across the assigned surveillance volume to be searched (151, 152, 153, 154) for targets 160. A waveform comprising a modulation of a Radio Frequency (RF) carrier is produced in the Exciter 120 under the precise synchronized timing control of the Synchronizer 110. For a typical Doppler Radar, the RF signal from Exciter 120 is referred to as a Waveform (WF) comprising a rapid sequence of a finite number of Amplitude (AM) and/or phase modulated (PM) pulses typically ranging from about 1-100 Kilo-Hertz (kHz) in Pulse Repetition Frequency (PRF), and 1-100 Micro-Seconds (uS) in Pulse Width (PW) for each pulse. Other types of WFs are possible such as Staggered PRF WFs, as are different pulse modulations such as Polarization Modulation. The specific PRFs and PWs employed by any given radar at any given time can vary significantly depending on the specific mission, parameters and functions being performed at the time.

The WF is subsequently amplified by RF Power Amplifier 130 the high power output of which then proceeds to the Transmit/Receive Switch or Duplexer 140. The Duplexer routes the high power amplified WF to the antenna 150 where it is transmitted into space 151 and directed so as to eventually cross the line of sight to a transiting target 160. The weakened WF is reflected from the target at 152, and then propagates back 153 into the antenna 154 and thence back to the Duplexer 140. The Duplexer routes the received WF signal to a Low Noise Amplifier 170, and then after amplification to the receiver 180 where it is down converted from RF to an Intermediate Frequency (IF) signal that can be appropriately sampled by an Analog to Digital Converter (ADC) 185. The ADC sampled digital data from the WF is then routed to a Signal Processor 190 wherein numerous algorithms such as a Doppler Filters in a Doppler Filter Bank 195 operate on the data to produce target (and sometimes False) detections 199. The digital data describing the detections (the range and Doppler bin the detections were made in, and from which beam that pointed in what direction) are then fed back to the Data Processor Digital Computer 100 for association, tracking and other radar functions prior to being broadcast and displayed to a user of the radar data.

The Doppler Filters 195 have in older radars been instantiated in hardware, and in some vertical markets less expensive and less precision radars might still use hardware instantiations. However, all modern radars will use algorithm-based Doppler Filters in software running on high speed Signal Processor hardware in order to realize the superior flexibility, standardization, reliability and performance that can be obtained from software vs hardware based Doppler Filters. It is these algorithmic Doppler Filters and their associated thresholding logic and algorithms that we wish to improve upon with the current invention. Note that most sensors will have a similar algorithmic processing flow admitting potential employment of the current invention.

Figure 2:
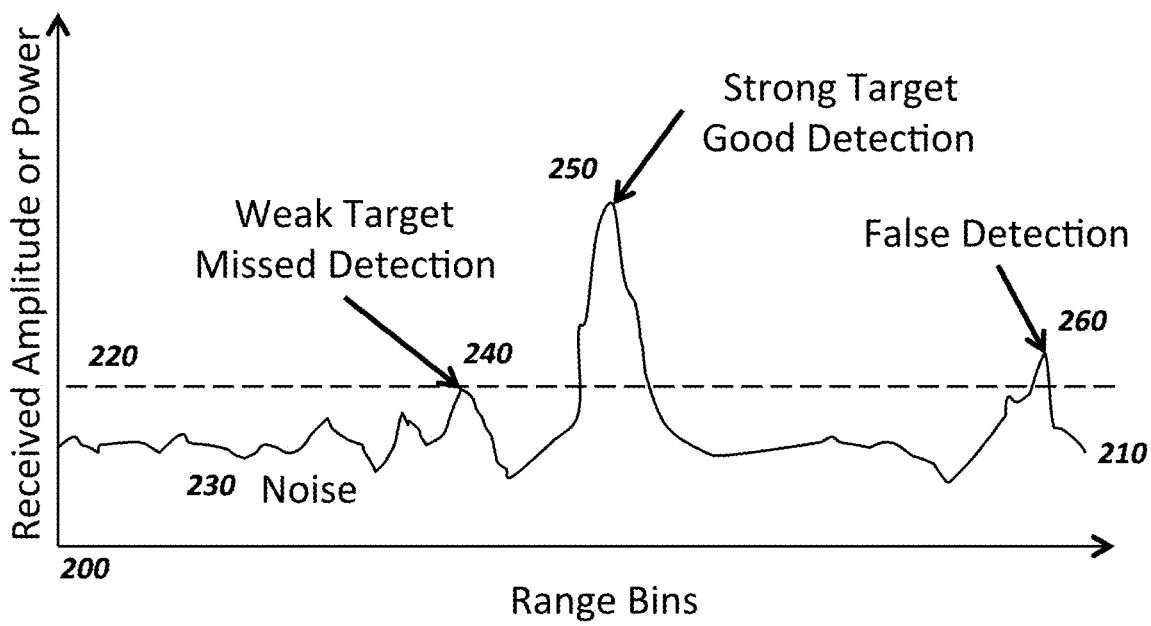
FIG. 2 shows a Prior Art plot of received Amplitude or received Power versus the Radar Range Bins from which the Amplitude or Power were received from. The figure also shows an example traditional Detection Threshold and three example conditions of a weak target detection being missed, a strong target being detected, and a noise signal creating a False Alarm detection.

FIG. 2 shows the Prior Art thresholding schema for a Pulse Doppler radar represented in a graph. This schema is also very similar for most other sensors. The axes 200 plot the Amplitude or Power output 210 from one of the aforementioned Doppler Filters in a Doppler Filter Bank 195 versus Range Bin providing the raw returned signal processed in the Doppler Filter. A Detection Threshold Level 220 is calculated either a priori or on the fly based on the perceived Mean Level (ML) of the Noise and Interference 230. Often this Mean Level is computed via a Constant False Alarm Rate (CFAR) algorithm that is well known to those skilled in the art of radar processing. The Threshold Level 220 is selected to attempt to maximize the sensitivity of the radar by being as low as possible, while also being high enough to ensure an average Probability of False Alarm (Pfa) lower than a system derived required numeric value under a given set of operating conditions. As such, the Detection Threshold represents a compromise between sensitivity and excessive false detections.

Despite even an optimum selection of a Detection Threshold 220, some weak targets 240 will fail to rise above the Threshold, although strong targets 250 will usually rise above the Threshold. Noise and Interference 230 will usually remain below the Threshold, but on a statistically random basis can conspire to spike above the Threshold to create a False Detection 260 which we seek to avoid.

The goal of the current invention is to enable lowering of Threshold 220 below that which would normally be tolerable, by facilitating the classification and identification of False Alarm Detection 260 as not being a true Target or Phenomenon Detection. False Alarm Detection 260 can then be rejected as a true Target or Phenomenon Detection, while still enjoying a greater sensitivity from the lower Threshold 220 that can then cleanly detect the weak true target 240. In this way then the Radar achieves higher detection performance while retaining or possibly even reducing a deleterious False Alarm Rate. Alternatively, it keeps the Probability of False Alarm (Pfa) from rising.

Figure 3:
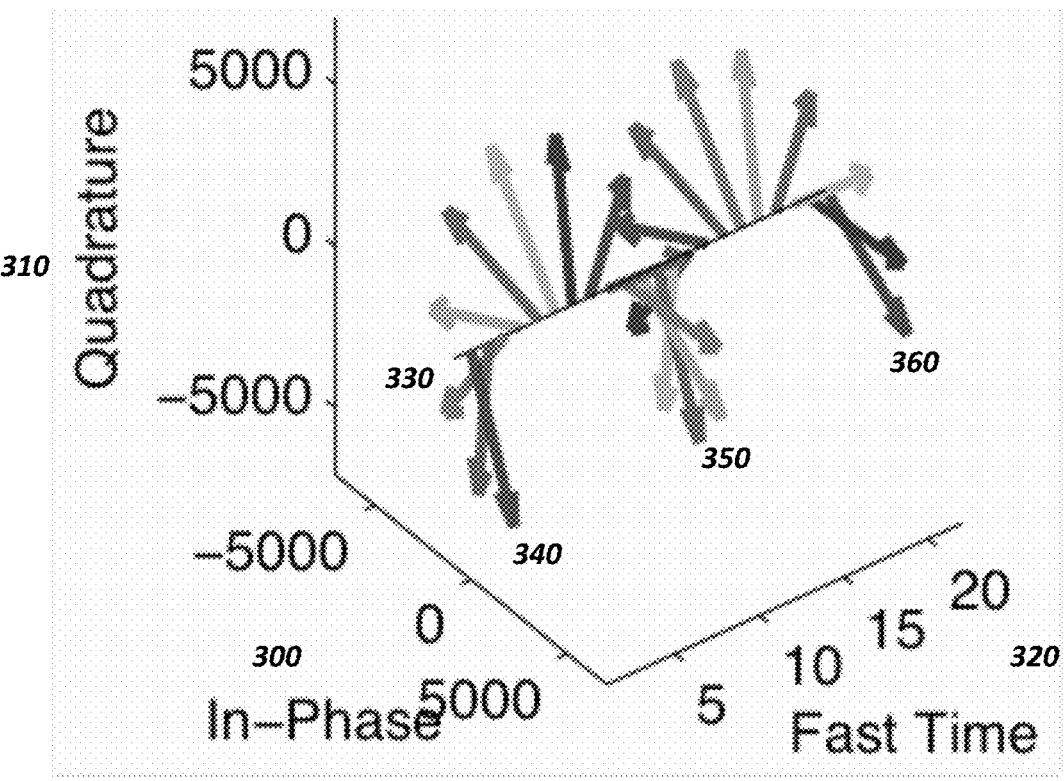
FIG. 3 shows a Prior Art three dimensional plot of the measured complex valued phasor amplitudes of each of the pulse returns captured within a single Range Bin from a Pulse Doppler radar employing a Waveform having 22 pulses.

FIG. 3 shows an exemplary Prior Art three dimensional plot of a sequence of complex voltage samples representing the returns of individual pulses from a single Range Bin from a Pulse Doppler Radar Waveform with 22 pulses. The In-Phase 300 and Quadrature 310 axes depict the digitally measured complex voltages from the dual channel I/Q ADC 185 of FIG. 1 (sometimes derived from a post-pended Hilbert Transform of a single channel ADC) as is well known to those skilled in the art of radar signal processing. The Fast Time axis 330 corresponds to the whole duration of a Waveform with the presence of returns from the individual pulses in the WF plotted along this axis typically at regular intervals proportional to the Pulse Repetition Interval (PRI=1/PRF). If the WF comprises a Staggered PRF, then the intervals between pulses will not be regular, but will still be prescribed.

Each Phasor Arrow (340 through 360) originates from the zero amplitude Fast Time axis 330 and represents the measured complex voltage amplitude of each pulse in the Waveform starting from the first pulse phasor 340, wrapping around the zero voltage Fast Time axis 330 at the $11^{th}$ pulse phasor at 350 and ending with the phasor for the last ($22^{nd}$) pulse at 360. In so doing, it can be seen that the measured phasor complex voltages of a sequence of received Pulse Doppler Waveform pulses maps out a Helix in the In-Phase and Quadrature Fast Time space. This is the natural behavior of a train of pulses reflected from a moving target and is the characteristic that permits Pulse Doppler radars with good Moving Target Indicator (MTI) or Doppler Filters to detect moving targets from among stationary clutter.

Figure 4:
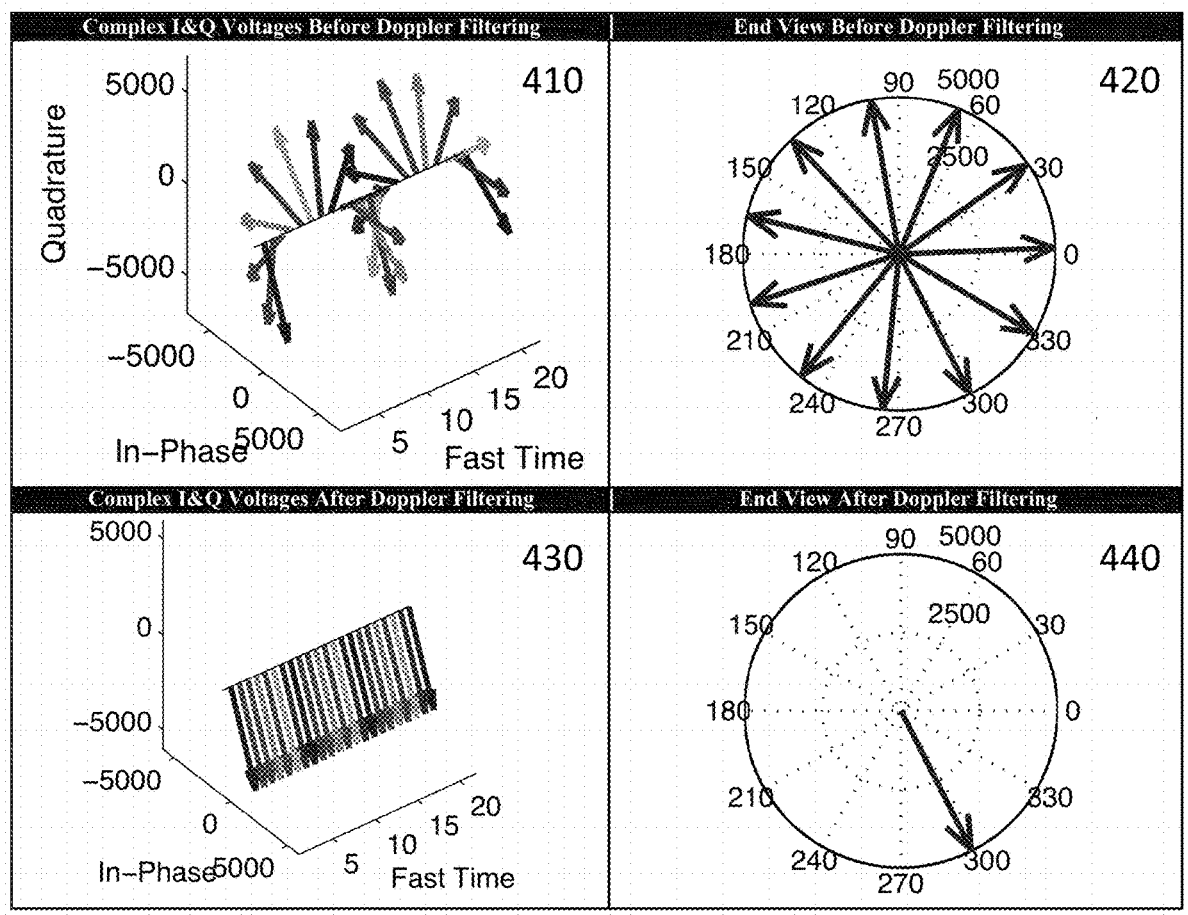
FIG. 4 shows a Prior Art depiction of how a Doppler Filter rotates all the Phasors of a received Pulse Doppler Waveform to be collinear, from whence they can be coherently summed to produce a large net summed amplitude target signal, but at the expense of loosing all the phase information on the individual Phasors after such summation.

FIG. 4 continues the Prior Art example illustrated in FIG. 3, showing the same Phasors as shown in FIG. 3 within the panel 410 of FIG. 4. Additionally, panel 420 of FIG. 4 shows the same Phasors as panel 410 but looking at them end on down zero amplitude Fast Time axis 330. As can be seen, all the Phasors are equally spaced in angle around said axis 330 for equal intervals between pulses in the Waveform. These angular intervals represent the phase change from one pulse to the next which is induced by the motion of the Target between pulses. Although an integral number of spacings are shown, there is no overt requirement for the end on view of the Phasors to manifest a whole number of equally sized angular spacings in this view. Only that the angular spacings from one Phasor to the next be the same. Note that these spacings may not be the same for variants of typical Pulsed Doppler waveforms such as for Staggered Pulses Waveforms.

Panel 430 of FIG. 4 shows the results after applying the first part of a Doppler Filter that is tuned to the Doppler Frequency of the received waveform depicted in Panels 410 and 420. This first part of the Doppler Filter comprises multiplying the complex Phasor voltage by a complex Doppler Filter coefficient number that will rotate the Phasor in the In-Phase and Quadrature plane. The Doppler Filter is designed such that these first parts of the filter computation (i.e. the complex coefficient multiplications) rotate the Phasors such that they all line up at the same phase angle as shown in Panel 430. The end on view of Panel 440 illustrates that all the Phasors are indeed aligned together at the same phase angle.

Note that this well mannered alignment only occurs if and only if the Doppler filter happens to be tuned to the Doppler Frequency of the received Waveform signal. If the filter does not happen to be tuned to the Doppler Frequency of the received waveform, the Phasors will not align, leaving a seemingly random orientation for each of the vector phase angles. Alternatively, if the Phasors comprise random noise as shown in FIG. 5, then the Phasors will appear both at random angles and also with random amplitudes.

Returning to FIG. 4, Panels 430 and 440, if the Doppler Frequency of the received signal does happen to match the Doppler Frequency that the current Doppler Filter is tuned to, the second step of the Doppler Filter (a coherent summation), will coherently add together all the resulting rotated Phasors. If these Phasors are all aligned in phase angle, then the magnitude of the resultant will be the maximum possible without changing the lengths of the Phasors. Note however, that if the Phasors are not all aligned in phase angle, any coherent summation will tend to average towards zero. This then applies both to a true Doppler signal processed by an unmatched Doppler Filter as well as to a Noise or Interference signal processed by any of the Doppler Filters in a Doppler Filter bank. Note also that Doppler Filter coefficients also usually have an amplitude component that serves to customize the filter response to more exacting specifications than just phase angle alone. However, this does not materially change the operation described above.

At this point we make a key observation regarding the limitations of the venerable Doppler Filter. FIG. 5 shows different views of Noise I/Q measurements, first [I,Q] measurements plotted as points in the I/Q plane 510, then as Phasors in the I/Q plane 520, then looking down the Fast Time axis 530 of the In-Phase 542, Quadrature 541 and Fast Time 543 space 540, and then showing the time series of the noise I/Q values as Phasors at 550. Inspection of FIG. 5 indicates that one of the noise vectors 560 shown (the 8th noise vector on the Fast Time axis) is unusually large. Since noise is random, there will indeed be occasions when such large noise measurements appear. The problem is that this vector is so much larger than the others, that when it is added to the sum of the vectors in the correlating process of the Doppler Filter, it will stand out and bias the sum far off of zero (recall that the sum of random noise vectors tends to zero on average but is never (or almost never) exactly zero for any one instance). Therefore, the output from this particular sampling of noise will NOT be at or near zero sum, but rather may have a potentially large value, despite having gone through the Doppler Filtering process. In many cases, the resultant output signal from the Doppler Filter may then be large enough to cross the threshold for detection and then be registered in the radar as a target detection, when in fact no target is present, only some aberrant noise. This phenomenology is what causes False Detections (because it was caused by noise and there is no real target present) and this is then also the cause of False Alarms.

Figure 5:
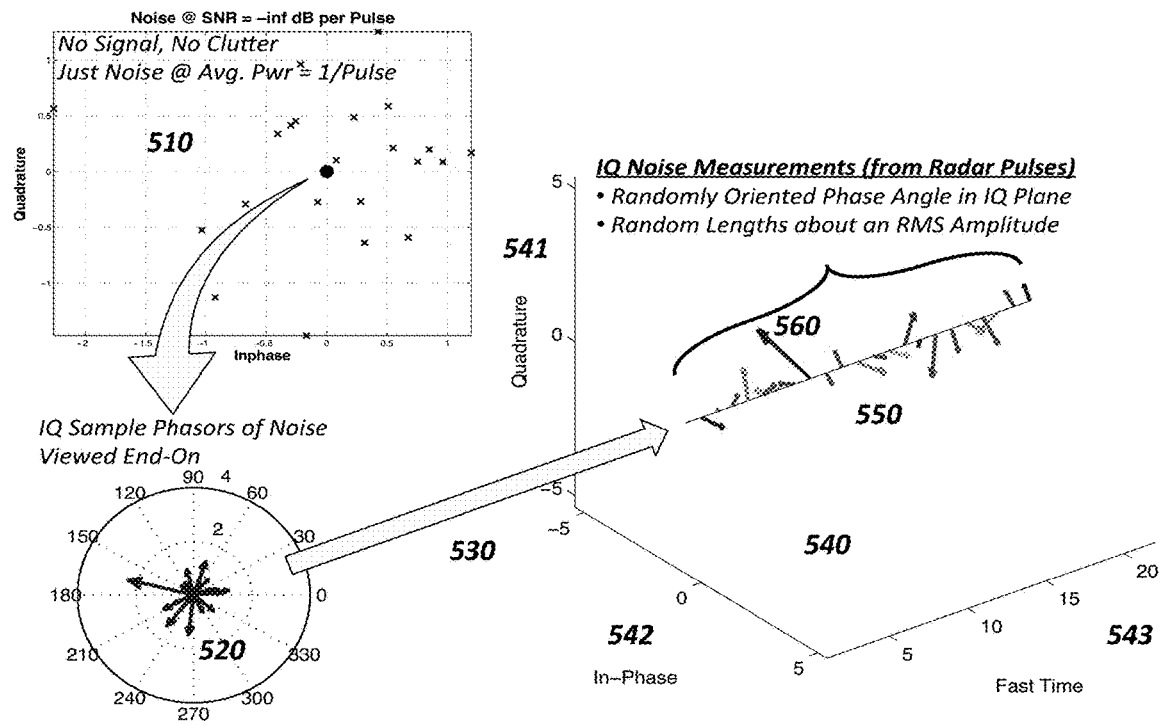
FIG. 5 shows the similar Prior Art depiction as FIG. 4 but for a pure Noise signal and how it manifest in the In-Phase, Quadrature and Fast Time space, showing the random Noise phasor rotations and magnitudes.

False Alarms are the bane of radars because in reality many noise sources (Phase Noise and associated Clutter Residue noise) have very "spiky" probability distributions meaning that there are lots of the large noise Phasors as shown in FIG. 5. Each one (or sometimes sums of them) can cause a False Alarm. Each False Alarm in turn typically implies a response from the radar that requires the additional expenditure of radar resource to address this false detection.

For example, since a radar typically cannot tell a true target detection from a false target detection cause by noise (as described above), it must expend additional radar resources in the form of a Verification dwell to re-interrogate the same beam position as the detection was sensed at and double check whether a target was really there or not. This can also start a cascade of unintended consequences such as expending track beams or even very radar intensive Non-Cooperative Target Recognition waveforms. Traditionally, the manner used to address this problem is to raise the Threshold level 220. However that has the deleterious impact of reducing the sensitivity of the radar. At the same time though, the radar designer seeks to make the radar as sensitive as possibly by reducing the detection threshold, but when we do that we admit more false alarms. If the detection threshold is not set correctly, the above process can form a vicious loop, causing a complete meltdown of the radar as it incessantly chases after false alarms, and in the process actually blinds it to real targets.

The fear of a False Alarm infinite loop and the presence of frequent non-Gaussian "spiky" clutter distributions with long tails often induces radar designers to set the Threshold 220 high, often in excess of 15 dB (over a factor of 30 SNR) in order to suppress the false detections (particularly if it is a radar that must operate in a clutter environment). But consider for a moment this statement. What the designer is saying is that a SNR of 30 times larger than the RMS noise level is needed before it can be allowed to declare a target. This means that one must expend an inordinate amount of our precious Power Aperture Product, not really looking to sense targets, for surely at even a SNR of 10 the target must be visible. But rather, Power Aperture Product is being expended to get the SNR high enough so that we will not be falsely triggered by noise! The key observation is that true targets are easily detectable at much lower SNR than 15 dB, but the infernal noise and its downstream consequences to radar resource utilization drive the designer to increase detection thresholds in order to excise those noise induced false detections.

To address these issues, another way is needed to excise noise sourced threshold detection crossings other than just raising the detection threshold What is needed is the ability to determine the root cause source of a given threshold crossing, that is, whether it came from the Doppler Filtered correlation of a true target's Doppler signature (in which we would want to declare it as a target) or alternatively whether it derives from an aberrant sample of noise (in which case we would want to reject and ignore it). This idea posits a new mechanism for target detection beyond the tried and true Marcum amplitude and power statistics, wherein one seeks to "Classify" a detection according to additional knowledge and features about its origins beyond the mere crossing of an amplitude or power threshold.

The current invention proposes to make this classification by using additional information that is currently thrown away, thereby enabling determination of whether a threshold crossing derives from a true target or noise (i.e., a false alarm), and in the process allow the radar to operate at a net lower detection threshold to improve sensitivity while throttling the occurrence of False Alarms. In this way the radar becomes more sensitive, requires less radar resources (less pulses) to do its core mission, thereby freeing up resource further improve performance or to do the auxiliary missions, all while preventing the radar from suffering an avalanche of False Alarms.

Employing a classifier to make the above described true target versus noise or interference decision is straight forward and might be given by any number of classification techniques that have been developed over the years (see for example the voluminous MATLAB Statistics and Machine Learning Toolbox User Guide from MathWorks weighing in at literally thousands of pages, and is incorporated herein by reference in its entirety). However, for any of these classification algorithms to work, one needs features, and in the context of this invention one will require features for the target or phenomenon signal and features for the noise or interference signal.

Figure 6:
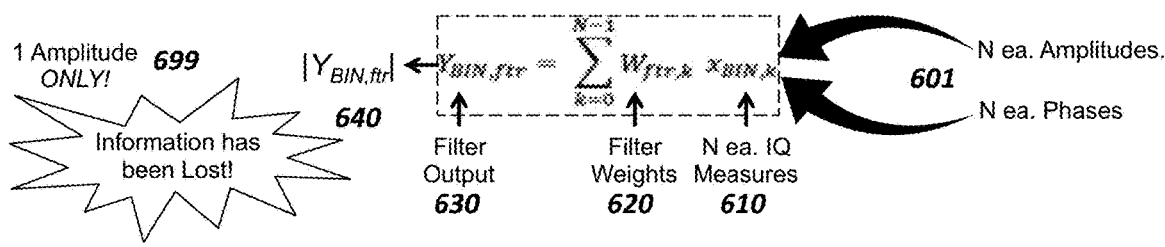
FIG. 6 shows a typical Doppler Filter Equation Computation, for each Range Bin ("BIN") and Filter ("ftr") for N total number of pulses, and shows how it reduces to one number derived from the amplitude which is the vector sum of the filter weighted inputs, and how this single scalar looses phase information about the inputs.

Features for the target or phenomenon signal may be suggested by examination of the typical Doppler Filter computation for each Range Bin and Filter as shown in FIG. 6. FIG. 6 shows the basic steps in the traditional Doppler Filter algorithm and the resultant key observation motivating this invention. The Doppler Filter equation is well known to those skilled in the art of radar signal processing. The multiple N pulses complex amplitude values input into the equation are eventually reduced to one output number derived by the filtered coherent sum of the inputs.

To compute the Doppler Filter, a sequence of amplitude and phase measurements of the individual pulses within a Doppler Waveform are accepted into the Doppler Filter at 601 and usually recast as a complex number with In-Phase and Quadrature (I/Q) components at 610. These are then complex multiplied element by element wise by the Doppler Coefficients (also referred to as Weights) at 620. This multiplication will rotate the sample I/Q phasors in the I/Q space and also potentially increase or decrease their amplitude depending on the magnitude of the complex weights. These resulting products are then summed up to give a coherently added sum of the products. Then the magnitude of this sum (which is still a complex Phasor) is computed at 640.

The key epiphany for the current invention is the observation that a number (N) of complex data with specific values and sequentially related characteristics go into the Doppler Filter at 601, but then only one single scalar number comes out at 699. In the process, all the information about the phases (and for that matter the individual amplitudes) and their relative relationships within the input I/Q data have been lost. This is information that is not completely translated, nor retained or contained in the one single scalar number at 699, and thence information about whether the I/Q data contain a true signal or only noise has actually been lost in computing the Doppler Filter. To be sure, one does eventually want a final binary decision flag indicating if the data represents a true target or phenomenon signal or not. However, to extract maximum information from the process, one must not throw away information before it has been mined for influence or has been deemed ignorable. In the case of FIG. 6, what has been lost is the information on the structure of the input data that resulted in the output amplitude $|Ybin,ftr|$. As a simple scalar, this value could be constructed from an infinite number of possible measurement inputs, and many of those would derive from noise or interference, thereby inducing False Alarms. It is the core goal of the current invention to recover and exploit the information lost in computing the Doppler Filter so as to provide improved probability of detection (Pd) performance without a decrease in Pfa, or similar improvement in Pfa without loss of Pd.

Given this epiphany, it's a key objective of the invention to then to attempt to extract ALL the information from the I&Q samples entering into the Doppler Filter, and not just some of it. To classify the data as representing either a true Doppler signal or noise, one therefore needs to extract additional features from the input I&Q data. There is already one decent feature, the traditional Doppler filtered amplitude output of the filter. However, there are a significant number of other features that might be derived from the available measured data and which are described next.

Referring back to FIG. 4, note that both of the left side panels do indeed manifest unique characteristics which do not manifest in the noise of FIG. 5. Specifically, in the top left panel 410 of FIG. 4, each of the I&Q vectors map out a helix, and if the signal is of the correct Doppler Frequency for this filter, then that helix must have a unique and measurable spin rate. If one can measure that spin rate and if it can be shown to correlate with the expected spin rate for that Doppler filter, then it indicates the Doppler Filter output is being generated by a true Doppler signal, and not just noise that has punched through the detection threshold. Further, the radius of each vector must have an amplitude of $|Y|/N$ where "Y" is the amplitude of the Doppler Filter output and N is the number of pulses. Note this is a unique signature that is much different than noise. Noise will have widely varying amplitudes, whereas the amplitudes of the helix samples will tend to be about the same. Note also that a similar analysis could be done for the Doppler Filtered samples prior to summation as shown in the bottom left panel 430 of FIG. 4. Again one can look for whether all the amplitudes are the same. Furthermore, one can also look whether all the complex sample vectors are all pointing in the same direction. Noise samples always point in random directions, whereas Doppler processed samples will all be co-aligned. Looking at the sample phases therefore allows easy measurement on how well they are co-aligned.

For both the helical features and the linear line up features, one can test for the presence of these features by performing a regression fit (curve fit) of the I&Q sample values to either a Helix (pre-Doppler filtered) or a linear line up (post-Doppler filtered). The advantage of the Helix fit is that it is actually independent of any Doppler filters: ALL Doppler signals manifest this helical structure in the I&Q and Fast Time space. The linear fit is good from the perspective of being easier and faster performance than the helical fit, but it will degrade if the target Doppler frequency is slightly off of the Doppler Filter frequency. One could alternatively perform a helical type fit in this case constrained by knowing that if the target Doppler frequency matches reasonably close to the Doppler Filter frequency, then the post processed samples will arch but not completely wrap like a full helix.

As well known by those skilled in the art of Regression analysis, quality measures of these regression fits include the Coefficient of Determination, also know as "R-squared" which is the square of the correlation coefficient from the fit. The regression can also provide a probability value (p-value) similar to those used in Statistical Hypothesis testing which provides the probability that the values input into the regression came from the regressed model versus coming from random noise. In this way then one can get an indication of how well the I&Q data matches the helical pre-Doppler Filter model or the linear line up post Doppler Filter model.

Another set of features may be derived by positing that the measurements are derived from noise or interference. One such feature is the statistical nature of the I&Q samples, particularly if they happen to constitute noise. In particular, the I&Q data can form a particular type of Auto-Regressive (AR) data time series that can be expressed in terms of Time Series Analysis (AR, ARMA, ARIMA, etc. types of autoregressive time series). If the data comprise noise, or have other induced variances, then other series designed to model stochastic variance evolution may apply (GARCH, EGARCH, GJR, etc.). In particular, various statistical hypothesis tests exist to assess the origin of a series of random or pseudo random data. For example, the Lilliefors Test (in MATLAB, lillietest.m) returns a test decision for the null hypothesis that the data in a sequence of measurements that comes from a distribution in the Normal family, against the alternative that it does not come from such a distribution. If the inputs to the Doppler Filter are thermal noise (nominally Gaussian for each of the In-Phase and Quadrature channels) then each of the I and the Q channels' data series can be subjected to the Lilliefors Test to assess if this data looks like Gaussian noise or not.

Alternatively, these types of statistical tests can be transformed to assess other types of distributions. For example, the same MATLAB Lilliefors Test optionally supports testing if the I and Q samples, when squared and summed, thereby representing the power in each sample, then manifest an Exponential distribution, which they will if the input noise of each I and Q channel individually is Gaussian noise. The amplitude of each Root Sum of the Squares (RSS) I&Q pair (voltage magnitude of the I and Q pair) will be a Rayleigh distribution if the I and Q each separately come from Gaussian distributions. This can be tested with a version of the Anderson-Darling Test (adtest.m function in MATLAB's Statistics Toolbox).

Each of these functions provides not only a decision on the hypothesis (which may or may not be useful in our case) but also a p-value indicating the probability of the Hypothesis being true or not (it is understood that is not the pristine Statistician definition of the p-value, but purists aside, the p-value provides a useful measure of the likelihood of the Hypothesis being true or not and works in the current situation).

A key potential issue with the tests described above and similar ones is if the number of pulses in a Pulse Doppler waveform is not particularly large. For a Normal distribution, reasonable statistical confidence is had with about 24 samples. Many radars employ fewer than this number of pulses and others employ more. More pulses will provide more reliable results from these tests. But an Artillery Battery can be sighted in with as few as 6 test shots, although more are desirable. So the tests above likely become of less value with fewer pulses and have higher value with more pulses. This really only makes sense since with fewer pulses there is less information entering the Doppler Filter from which additional information might be gleaned.

The discussion above has been focused mostly on statistics based tests on candidate input I and Q voltages, which may or may not be noise voltages, and how closely those distributions might resemble a known noise distribution, and might have created a False Alarm. Note that with suitable changes, similar types of statistical tests might also be done on signals of true targets, although these might be less reliable due to the larger differences in true target signals versus noise. The question then arises whether there is something about the target signal I&Q samples that might be unique and different from the noise, and which might then be tested for to provide a unique signal feature for classification. A similar type approach might be used to develop a Signal distribution test instead of a noise distinction test. Note that when the Doppler frequency complex voltage vector spins around the time axis, if the time sequence is discarded, then it will have the statistical distribution of a sine wave for both the I and the Q channel. These distributions are not one of the traditional common ones like already discussed, but a transform can be created to transform that distribution into a normal distribution where it can then be tested with the Anderson-Darling or Lilliefors Test. Consequently, both noise and signal can be characterized by their statistical distributions, and thence tested to assess the likelihood of the I&Q data being one or the other.

Then too, there are parametric descriptions of the noise and also potentially signal that can be employed as features in a classifier. Statistical parameters such as the mean, median, mode, standard deviation, skewness, kurtosis (along with or replaced with their statistical moments counterparts) provide a number of features that can be used for classifying the noise, and potentially the signal too. For example, most radars already maintain some measurement of noise parameters to alert the operator of a malfunction creating more noise than there should be. Average RMS (Root Mean Square) noise power and related statistical moments are easily obtained over time. Also Order Statistics (i.e. a histogram of the distributor) can identify if the majority of I&Q noise samples are within the typical noise distribution envelope with only one or two outliers causing a false detection to occur.

Figure 7:
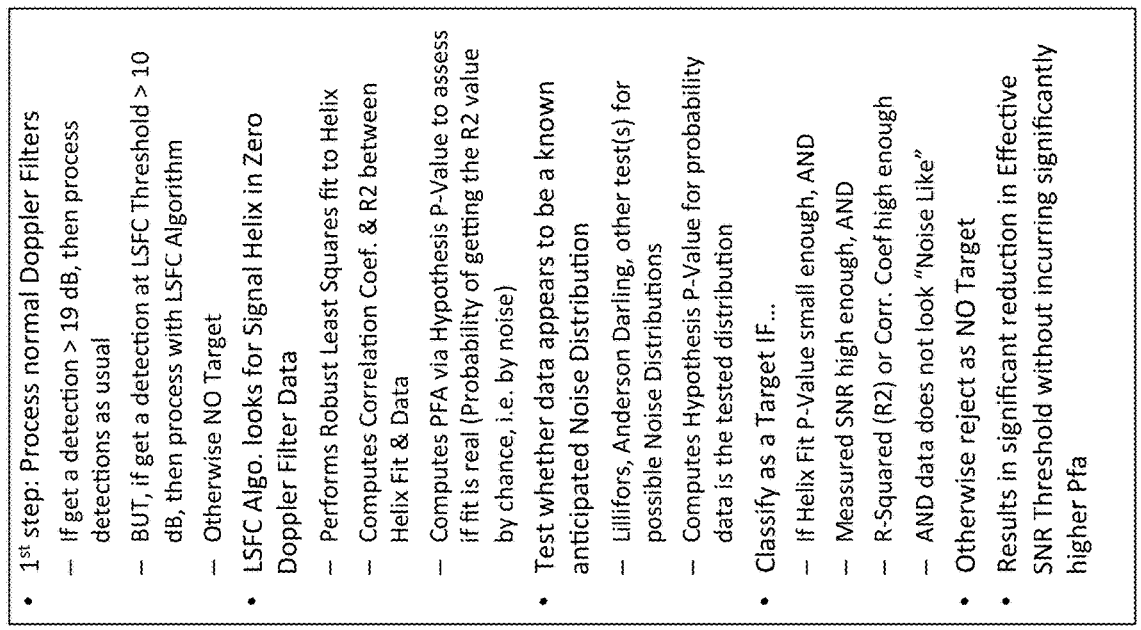
FIG. 7 shows an exemplary process diagram for implementing a preferred embodiment of the current invention including some optional steps not necessarily required to enjoy the benefits of the invention, but which would likely increase its overall performance if adopted.
Figure 7:
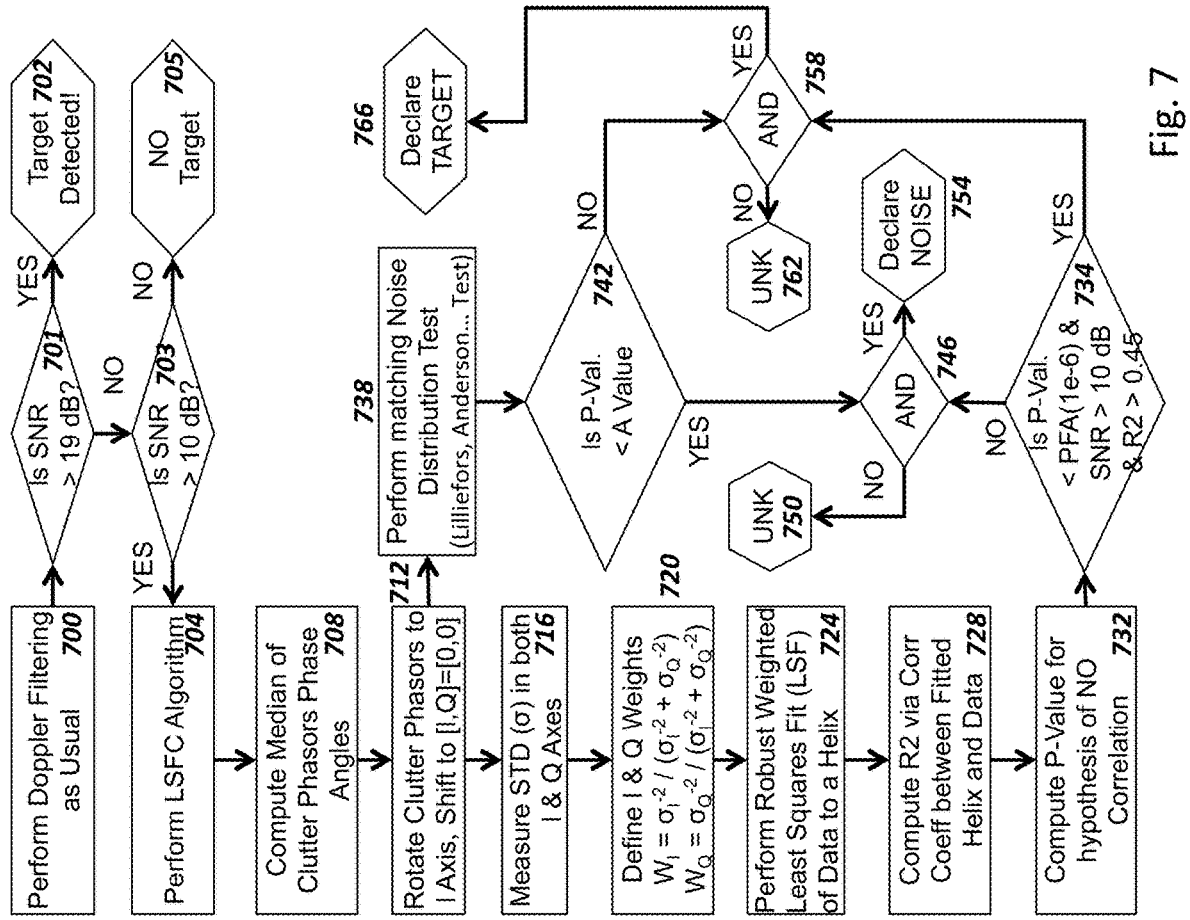

As might be appreciated by one skilled in the art of sensor algorithms, there are a very large number of specific embodiments that might be created using combinations of the key elements taught by this invention. FIG. 7 shows the key general elements and how they may be combined to provide one embodiment of the invention using the teachings herein to provide the the goal of this invention that is, enhanced sensitivity with simultaneously reduced probability of false alarm.

The first step shown in FIG. 7 is to perform Doppler Filtering as usual at 700 in some manner similar as shown in FIG. 6. This step might be replaced with other alternatives such as Moving Target Indicator (MTI) or other traditional detection algorithms and is actually optional, but may be valuable in minimizing total computational burden since just performing a Doppler Filter operation is likely less computationally intense than performing the totality of the whole process of FIG. 7 on every candidate range and Doppler cell. If the Signal to Noise Ratio (SNR) out of the Doppler Filter(s) is greater than a threshold at 701, then a target is immediately declared at 702 without further processing of that range Doppler bin.

The threshold used at 701 is usually derived from a multiple of a local Mean Level value computed from a Constant False Alarm (CFAR) Mean Level processor as is well known by one skilled in the art of Radar Signal Processing, and is adjusted, either via theoretical analysis or empirically, to provide a very low Probability of False Alarm (Pfa) meeting total sensor system requirements, often circa a probability value of 1 E-6 per detection opportunity. This threshold is dependent on the environment and the circumstances that the radar is operating in. For example, if the radar is operating in free space without any clutter, then the threshold may be a lower value, possibly around 10 dB or even lower. However, if the radar is operating in a high clutter environment, the threshold may need to be set to much higher value, say about 19 dB or possibly greater, to ensure an acceptable Pfa. This difference arises because of the differences in the shapes of the probability distributions of different types of noise or interference. Hence free space operation implyies noise that is more Gaussian in nature, and high clutter operation implyies noise and interference (clutter residue) that is more Weibull or Log Normal in nature, the later distributions typically having significant tails which demand a higher threshold to enforce a given Pfa.

If the output from the Doppler filtering at 701 is not greater than the threshold, then the process passes to 703 where a minimal SNR is tested for. The threshold for this SNR test is also derived either by theoretical or empirical means to reflect an a priori known worse case situation wherein any signal lower than this threshold is hopelessly indeterminable as to whether it might be a true Target or a False Detection induced by noise or interference. The focus of the invention will then be to recover true signal or phenomena detections between the two thresholds of 701 and 703 without incurring a higher Pfa as a result, which would normally be the case with prior art approaches. Therefore if the output of the Doppler filtering of 700 is not higher than the threshold of 703, a declaration of no target is made in 705.

Alternatively, if the output of the Doppler Filtering at 701 is higher than the threshold of 703, then the process continues by performing the Least Squares Filter Classifier (LSFC) at 704. The first part of this further processing is to compute the Median (or other suitably robust mean estimator) at 708 of the received In-Phase and Quadrature (I/Q) sample values from pulses in the Doppler Waveform (for example the previous described 22 pulses). The Median is taken of the 22 In-Phase values and the Median is taken of the 22 Quadrature values to compute Medians for each. These Median values are then used to rotate the centroid of the I/Q complex data (i.e. the 22 pulses complex sampled values) onto the In-Phase axis (alternatively the Quadrature axis could be used) at 712, and then the center of the 22 complex values are further shifted to the center of the I/Q complex plane again using the In-Phase Median (or alternative Quadrature Median) to define the required amount of shifting. At the end of 712 the robust Median derived centroid of the Pulsed Doppler radar Waveform's I/Q pulse samples are centered on the (0,0) point of the complex plane. This has the effect of having removed the majority of the substantially unvarying clutter offset from the received I/Q data.

Once the above steps have been performed, the Standard Deviation and potentially other statistical moments (Kurtosis, Skew, etc.) may be optionally computed on the now centroided I/Q data at 716. These can be further used to screen the data for sanity and suitability for further processing to include Outlier detection and censoring. Additionally, the Standard Deviation can be optionally used to define I and Q weights in 720 that will be of potential use in performing optimal weighted fitting in the subsequent Least Squares Fit (LSF) process at 724.

The LSF process of 724 invokes most any of the well known linear or non-linear regression techniques known to those skilled in the art of regression mathematics, with a focus on regressing (fitting) the I/Q data to the structure of the data were a true target present. Although other forms of data and processing might exhibit other structures, and the current invention admits these alternatives within the definition of the current invention, we here demonstrate the typical ideal structure of I/Q data within the construct of Pulse Doppler radar data. In this case, the structure of the I/Q data will always exhibit a Helical structure centered about the $[I,Q]=[0,0]$ Fast Time axis, and rotating about this axis stretched along Fast Time in the order the pulse samples were taken during reception of the Pulse Doppler Waveform. It should be noted that these I/Q data that exhibits a helical structure is pre Doppler Filtering.

The fitting of a helix to the I/Q data can be performed in different ways again known to those skilled in the art of regression analysis. A common way might be to treat the In-Phase channel data separately from the Quadrature channel data and then combine the results. Doing this allows the In-Phase data to be fit to a Sine function and the Quadrature data to be fit to a Cosine function, jointly constrained to have the same relative phase. Alternatively, a more sophisticated formulation may fit to a true helical three dimensional model outright.

Regardless of the specific means for fitting the data to a Helix structure, the output of the LSF at 728 will include estimates of the helix parameters, estimates of the errors in those estimates, computed Correlation Coefficient or alternatively the Coefficient of Determination (R-Squared), and at 732 the Probability Value (P-Value) corresponding to the probability of the Hypothesis that the sampled I/Q data really came from a random sampling rather than from data truly derived from a helical structure.

With these above statistical results now in hand, one can perform a test at 734 as to whether the I/Q data provides sufficient evidence of having the sought for Helical structure, or not. The P-Value will indicate if the I/Q data might have come from a random selection of I/Q samples, meaning it would indicate the I/Q data does not have the Helical structure needed to confirm the existence of a true target or phenomenon signal. Furthermore the R-Squared (R2) or alternatively the correlation coefficient can indicate how well the I/Q data fit the fitted Helical model. If these statistics indicate the presence of a true Helical structure in the I/Q data, and the processing proceeds from 734 to 758 where as will be discussed subsequently, this decision may be further confirmed by the I/Q data not exhibiting a noise like distribution when computing along the path through 738, in which case a final decision can be made to declare the original Doppler Filter output from 700 as being a target in 766. Note that decision 758 (and thence computation of the path through 738) is not overtly needed to go from 734 to 766, and is thereby optional, but it should normally provide an additional assurance that the decision at 734 is correct, thereby increasing the Probability of Detection while minimizing the Probability of False Alarm. Alternatively, if the inputs to 758 conflict, this is indicative that the I/Q data both exhibit Helical structure, and yet also exhibit Noise-like distribution characteristics, which presents a contradiction and hence ambiguity that might be relegated to declaration of the output from 700 as being Unknown in 762. This path though 762 would usually be interpreted as a non-detection, but it could also or alternatively trigger performing additional testing of the I/Q data (for example testing a different potential noise distribution type in 738) or perhaps invoking the radar to take some other remedial action such as re-interrogating the target.

Returning to 734, if the results of testing the computed statistics indicates that the I/Q data does not reflect a good fit to a Helical structure model, then the processing will proceed to 746. At this point, if the potentially optional path through 738 is computed, the logical test at 746 may assess whether the I/Q data both did not manifest significant similarity to the structure of a Helix, and that it also did manifest the statistical distribution of the anticipated noise distribution were a true target signal or phenomenon signal not present. In that case the processing will move to 754 and a declaration will be made that the output from the Doppler Filter at 700 really came from noise rather than a true target or phenomenon. Alternatively, if the two inputs to 746 conflict, the nature of the output from 700 remains ambiguous and is thereby declared as Unknown. Usually this would be interpreted as a non-detection in order to minimize Pfa, but it could also be a trigger for performing additional testing of the I/Q data (for example testing a different potential noise distribution type in 738) or perhaps invoking the radar to take some other remedial action such as re-interrogating the target.

A potentially optional but likely recommend additional processing is through 738 wherein tests are performed on the I/Q data to determine if their statistical distribution matches an expected noise or interference distribution. Expected distributions might include Gaussian, Rayleigh, Rician, Weibull, Log-Normal and possibly other distributions indicative of thermal noise, clutter residue noise, combinations of these and also combinations with true target signals (for example the aforementioned Helical structure of the I/Q data were the a true target or phenomenon is present). This assessment can be done by the use of a variety of statistical tests well known to those skilled in the art of probability and statistics, such as the Lillifors and Anderson-Darling tests, among other, and variants thereof to accommodate different distribution types. Each of these tests will provide a P-Value that may be tested at 742 to ascertain whether the I/Q data likely comes from the tested distribution or whether it might have come from a random selection of samples or another distribution. It should be noted that 738 could comprise a multiplicity of different distribution tests, each looking for one of the possible noise types that might be encountered by the Pulsed Doppler radar, and these then combined with OR-like logic for input to the decisions at 746 and 758. The threshold for the test at 742 may be determined theoretically or empirically, the latter being likely preferred in order to study the possible side effects introduced by real world data. The results of 742 then inform 746 and 758 as described previously.

It should be noted that the basis of this invention is the proposition of gleaning additional and maximum information from the received signal data from a sensor primarily by detailed examination of discernible characteristics and inter-sample relationships in the time sequence of sampled data. As such, much of this depends on the statistics of these data sequences. One of the key attributes of statistics at large is that more samples provide better higher confidence statistics and thence better results, and the reverse is true. This suggests that the current invention does impose a prerequisite for needing a multiplicity of measurements for prospective detection enhance, not unlike as found in Pulse Doppler radar. Many other sensors also implement similar schemes where a multiplicity of data are used to form a singular detection decision, and the current invention would be adaptable to most all of these in one form or the other by one skilled in the art for that sensor technology. Recognition of these dependencies does however reveal the weakness of the invention, which is that if there are only one or very few samples employed by the sensor in the formation of a detection decision, then the underlying statistical nature of the invention may prevent significant benefit. For example, a two Pulse Moving Target Indicator (MTI) type of radar might not enjoy much benefit from the invention as described herein because so few I/Q samples (2) are employed in its basic operation. However, the teachings herein may still be employed to make some improvements, particularly where noise level characterization is concerned.

Figure 8:
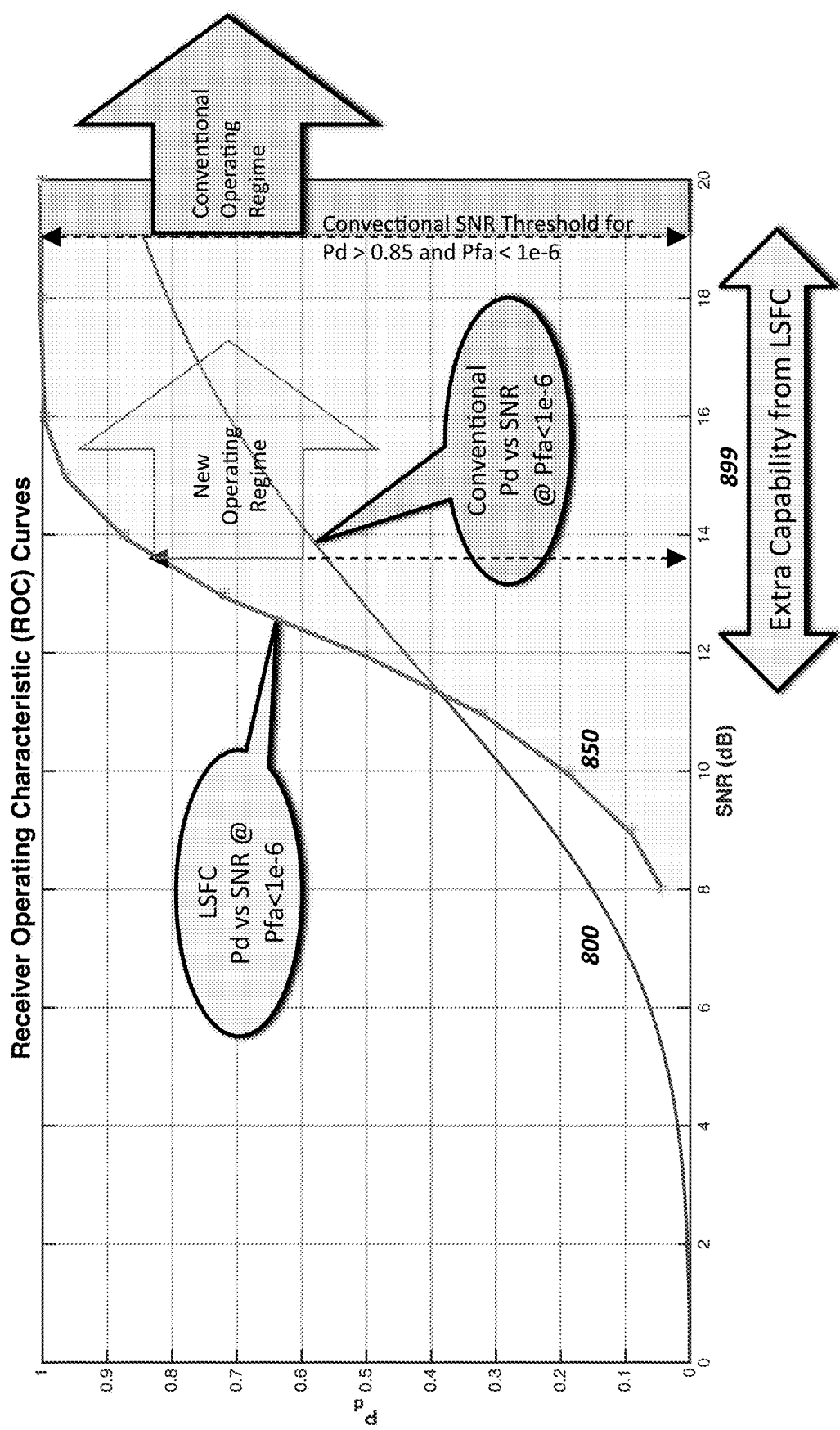
FIG. 8 shows an exemplary comparison of Probability of Detection (Pd) versus Signal to Noise (SNR) for both the cases of not using and using the current invention so as to permit direct comparison and quantification of the Pd improvement enjoyed through use of the invention.

FIG. 8 shows an example improvement enjoyed in a Pulse Doppler radar employing 22 pulse waveforms through the use of the teachings of this invention. The figure shows where a typical radar 800 might operate to provide the illustrated probability of detection (Pd) performance curve with the cited Probability of False Alarm (Pfa) of 1 e−6 for the modeled noise and clutter models. The arrow pointing to the right indicates the enlarged detection space 850 provide by the new algorithms (here referred to as LSFC for Least Squares Fit Classifier), which amounts to almost 6 dB at a Pd=0.85 and Pfa=1 e−6 even with this rather unoptimized prototype implementation of the invention which here does not implement the path through 738 of FIG. 7. Note that there is still additional performance below this cited Pd level, and the line for the LSFC stays above the conventional Radar Operating Curve (ROC) curve down to almost 11 dB SNR. This provides additional margin capability as illustrated by the arrow 899 under the plot if lower Pd were desired and acceptable. This regime constitutes an ability to better detect targets further beyond the threshold detection range while still maintaining the required Pfa.

The example of FIG. 8 captures a limited subset of the features described above and is implemented with a simple pseudo manual classification of the features. The target model takes into account most of the key noise sources including thermal noise, phase noise and amplitude modulation noise as well as the DC component of clutter. This example is not indicative of an optimized algorithm or processing design. At the same time, it is noted that radars operating at lower SNRs can still enjoy the benefits of this invention, but the net improvement will be smaller on an absolute basis, although the said improvement might still be comparable on a relative basis.

The present invention may be applied to a wide variety of sensors wherein the key requirement for employment is the production and use of a sequence of data for each detection declaration opportunity. The said sequence can be temporal, spatial or spatio-temporal in nature. Additionally, other types of measurements can be used (for example Polarization). It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein.

Having thus described my invention and the manner of its use, it should be apparent to those skilled in the relevant arts that incidental changes may be made thereto that fairly fall within the scope of the following appended claims, wherein I claim:

The invention claimed is:

1. A method for processing Doppler radar data to improve differentiation between a true signal and noise, said method comprising: accepting received timed data into a Doppler filter; fitting the timed data to at least one of: a model of a feature characteristic of a signal to produce a first output comprising a measure of goodness of fit to the feature characteristic of a signal and fitting the timed data to a model of a feature characteristic of noise to produce a second output comprising a measure of goodness of fit to the feature characteristic of noise; entering the at least one of the first and second outputs as a measurement feature into a classifier algorithm; and based on predetermined or dynamically computed classification parameters, producing an output classifying the timed data as comprising only noise with a predetermined level of confidence and/or as comprising noise and a signal with a predetermined level of confidence wherein the timed data comprises In Phase and Quadrature (I&Q) data and said method comprises mapping In Phase and Quadrature (I&Q) vectors, determining a helix spin rate for the mapped I&Q vectors, and comparing the determined helix spin rate to an expected helix spin rate for a true signal associated with the Doppler filter.

2. The method of claim 1, wherein the timed data is selected from the group consisting of: amplitude and phase data, In Phase and Quadrature (I&Q) data, spatial sequenced measurement data, spatio-temporal measurement data, pulsed Doppler waveform data comprising a sequence of pulses, and combinations of these.

3. The method of claim 1, wherein the timed data is fitted to both of the model of a feature characteristic of a signal to produce a first output comprising a measure of goodness of fit to the feature characteristic of a signal and the model of a feature characteristic of noise to produce a second output comprising a measure of goodness of fit to the feature characteristic of noise.

4. The method of claim 1, wherein the method additionally comprises performing a target detection thresholding algorithm before or after said accepting timed data into a Doppler filter.

5. The method of claim 1, wherein the timed data comprises I&Q data and said method comprises determining a variability in amplitudes of the I&Q data.

* * * * *